United States Patent [19]
Flockhart et al.

[11] Patent Number: 5,684,872
[45] Date of Patent: Nov. 4, 1997

[54] PREDICTION OF A CALLER'S MOTIVATION AS A BASIS FOR SELECTING TREATMENT OF AN INCOMING CALL

[75] Inventors: Andrew Derek Flockhart, Thornton, Colo.; Eugene Paul Mathews, Barrington, Ill.

[73] Assignee: Lucent Technologies Inc., Murray Hill, N.J.

[21] Appl. No.: 505,142

[22] Filed: Jul. 21, 1995

[51] Int. Cl.$^6$ .................. H04Q 3/64; H04M 3/42
[52] U.S. Cl. .................. 379/266; 379/67; 379/113; 379/127; 379/209; 379/265; 379/309
[58] Field of Search .................. 379/188, 189, 379/196, 201, 208, 209, 211, 265, 266, 309, 112, 113, 133, 134, 67, 88, 89, 127, 221

[56] References Cited

U.S. PATENT DOCUMENTS

| | | | |
|---|---|---|---|
| 4,847,890 | 7/1989 | Solomon et al. | 379/196 |
| 5,291,550 | 3/1994 | Levy et al. | 379/265 |
| 5,299,260 | 3/1994 | Shaio | 379/265 |
| 5,329,578 | 7/1994 | Brennan et al. | 379/67 |
| 5,335,269 | 8/1994 | Steinlicht | 379/265 |
| 5,506,898 | 4/1996 | Costantini et al. | 379/266 |
| 5,509,064 | 4/1996 | Welner et al. | 379/265 |
| 5,537,470 | 7/1996 | Lee | 379/266 |
| 5,537,611 | 7/1996 | Rajagopal et al. | 379/221 |

*Primary Examiner*—Krista M. Zele
*Assistant Examiner*—Scott Wolinsky
*Attorney, Agent, or Firm*—David Volejnicek

[57] ABSTRACT

An improved method and apparatus (12) for handling calls in a call center predicts (206, 312, 410) a caller's level of motivation for making the call and uses (208–212, 314–330, 412–416) the prediction as a basis for determining how to handle the call. The method and apparatus respond to a call coming in to the call center by determining (206, 306, 404) a number of call attempts—either all call attempts whether answered or unanswered by an agent, or only unanswered call attempts—made by the caller to the call center within a predetermined elapsed period of time, and possibly also by determining (308–310, 406) other predictors of the level of motivation of the caller in making the call, prior to the call being answered. Based upon the determined number of call attempts and the other predictors of the caller's motivation level, the method and apparatus then select and give (208–212, 314–330, 412–416) to the call one of a plurality of different treatments that could possibly be given to the call—for example, they select a split to which the call should be queued and/or a priority level for queuing the call. Preferably, the selected treatment is given to the call before an agent of the call center answers the call.

30 Claims, 3 Drawing Sheets

PREDICTION OF A CALLER'S MOTIVATION AS A BASIS FOR SELECTING TREATMENT OF AN INCOMING CALL

TECHNICAL FIELD

This invention relates generally to call centers, also alternatively known as telecenters or automatic call distribution systems.

BACKGROUND OF THE INVENTION

Call centers are systems that enable a group of agents to serve incoming and/or outgoing calls, with the calls being distributed and connected to whichever of the agents happen to be available at the time of the call. Call centers are well known in the art.

Call centers that serve incoming calls often use call-related information such as ANI (the calling number) and DNIS (the called number) to determine what treatment to give to each call before the call is answered. They also give access (queue an incoming call for answering, and answer the call) or deny access (return a busy signal to the incoming call, or connect the call to a pre-recorded announcement) to the call center and/or its agents based on availability of call center resources such as telephone incoming trunks and agents. In making these decisions, the call centers do not try to determine the caller's motivation for making the call and to take the caller's motivation into consideration in deciding how to treat the call. Rather, caller motivation is determined by an agent and is taken into consideration by the agent only after the agent has answered the call.

Evidence indicates that a major, if not the main, reason why existing customers terminate a business relationship is the treatment that they have received from the business. It therefore behooves a business to give perfect treatment to prospective and existing customers. However, because businesses, and call centers acting on their behalf, have only limited resources to apply to this endeavor, it is often a goal that is impossible to achieve. Given this reality, it is in a business' best interest to give the best treatment to prospective and existing customers who are most likely to produce value for the business. But in order to make this evaluation of how likely the customer is to produce value for the business, it has typically been necessary to speak with the customer, or to use directly-available information such as ANI and/or DNIS as a predictor of value. In the former case, the evaluation has not been available for a call center to decide what treatment to give to a call prior to answering the call. And in the latter case, the evaluation has often been found to be either inadequate or inaccurate.

SUMMARY OF THE INVENTION

This invention is directed to solving these and other problems and disadvantages of the prior art. Generally according to the invention, the inventors have recognized that a caller's level of motivation for making a call to a call center is a significant factor in whether the call is likely to be value-producing for the call center or a business that the call center represents. The inventors have further realized that the level of the caller's motivation for making the call may be predicted, or estimated, from information that is in some manner, whether direct or indirect, related to the call and that may be obtained at the call center prior to answering the call and speaking with the caller. For example, the inventors consider the number of call attempts by the caller to the call center within a predetermined elapsed period of time to be a prime indicator of the caller's level of motivation.

According to the invention, therefore, there is provided a method and an apparatus for handling calls in a call center, that functions in the following manner. In response to a call from a caller coming into the call center, the level of motivation of the caller for making the call is predicted prior to the call being answered. Based upon the predicted level of motivation, one of a plurality of different possible treatments to be given to the call is selected, and the selected treatment is then given to the call at the call center, preferably also before an agent of the call center answers the call. By factoring the caller's predicted level of motivation for making the call into the decision of how to treat the call, the method and arrangement at least improve, if not optimize, the treatment of calls that are likely to be most valuable to the call center, and hence improve the business relationship between a business and its valued customers.

These and other features and advantages of the invention will become more apparent from the following description of an illustrative embodiment of the invention taken together with the drawing.

DETAILED DESCRIPTION

Figure 1:
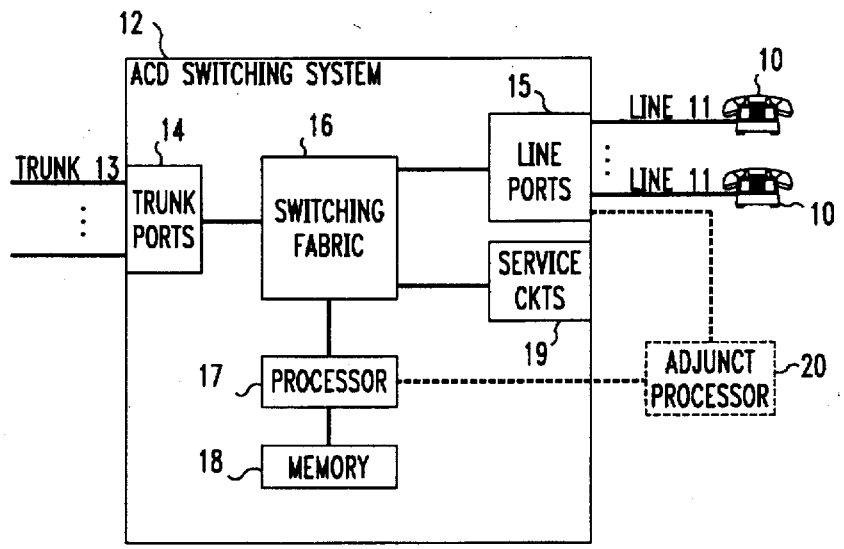
FIG. 1 is a block diagram of an illustrative call center that embodies an illustrative implementation of the invention.

FIG. 1 shows a typical call center. It comprises a plurality of agent's telephones 10 connected by telephone line 11 to an ACD switching system 12. Switching system 12 interconnects lines 11 with telephone trunks 13 that are connected the public telephone network (not shown). Internally, switching system 12 includes trunk ports 14 that terminate trunks 13, line ports 15 that terminate lines 11, and a switching fabric 16 that interconnects ports 14 and 15. Switching system 12 is a stored-program-controlled system that operates under control of a processor 17 which executes ACD control programs that are stored in memory 18. Optionally, switching system 12 may be equipped with an adjunct processor 20 that supplements the capabilities of processor 17. ACD switching system 12 is illustratively the AT&T Definity® ACD private branch exchange (PBX).

According to the invention, the control programs of switching system 12 have been supplemented or modified to predict a caller's level of motivation for calling, and to make this motivation a factor in determining what treatment to give to the call even before the call is answered. There is a myriad of conditions and caller behaviors that can be used as predictors of caller's motivation. Most are dependent upon the particular application to which the call center is put. It is therefore impractical to try and list them here. However, one predictor which the inventors believe to be fairly universal is the number of call retries by the caller during a predetermined time interval. The following scenarios illustrate practical uses of this predictor.

SCENARIO 1—AIRLINE RESERVATIONS

Assume an airline reservation service that conventionally has two separate "800" numbers, one for "basic" customers such as new customers, and one for "preferred" customers such as repeat customers or customers who have accumulated some predetermined number of frequent-flyer miles. The difference in call treatment given to these two "800" numbers is the priority level at which callers are queued. The call center has a capability to queue at four levels of priority—low, medium, high, and top—but it normally queues basic customers at low priority and queues preferred customers at high priority.

According to the invention, the level of a caller's motivation is deemed to be directly reflected in the number of times that the caller—who is identified by his or her ANI—has called the reservation system in the previous 24 hours. At the call center's option, either all calls of the caller to the call center may be counted, irrespective of whether those previous calls have or have not been answered by an agent, or only calls that went unanswered by an agent may be counted, with the count being reset to zero when a call of the caller is answered by an agent. For this purpose, ACD switching system 12 keeps a database in memory 18 (or alternatively in adjunct processor 20) that indicates the calling telephone number of calls that have reached switching system 12 over trunks 13 within the past 24 hours, particularly of those calls that were given a "busy" indication by switching system 12 or that were abandoned while waiting in queue. The modified call treatment with caller motivation factored in is as shown in Table 1 below.

TABLE 1

| "800" number called | number of calls in past 24 hours | queuing priority level |
|---|---|---|
| basic | 1 | low |
| basic | 2 | medium |
| basic | 3 | high |
| basic | 4+ | top |
| preferred | 1 | high |
| preferred | 2+ | top |

As this example shows, a basic customer who is deemed to be highly motivated is given priority over a preferred customer who is deemed to be less motivated.

Figure 2:
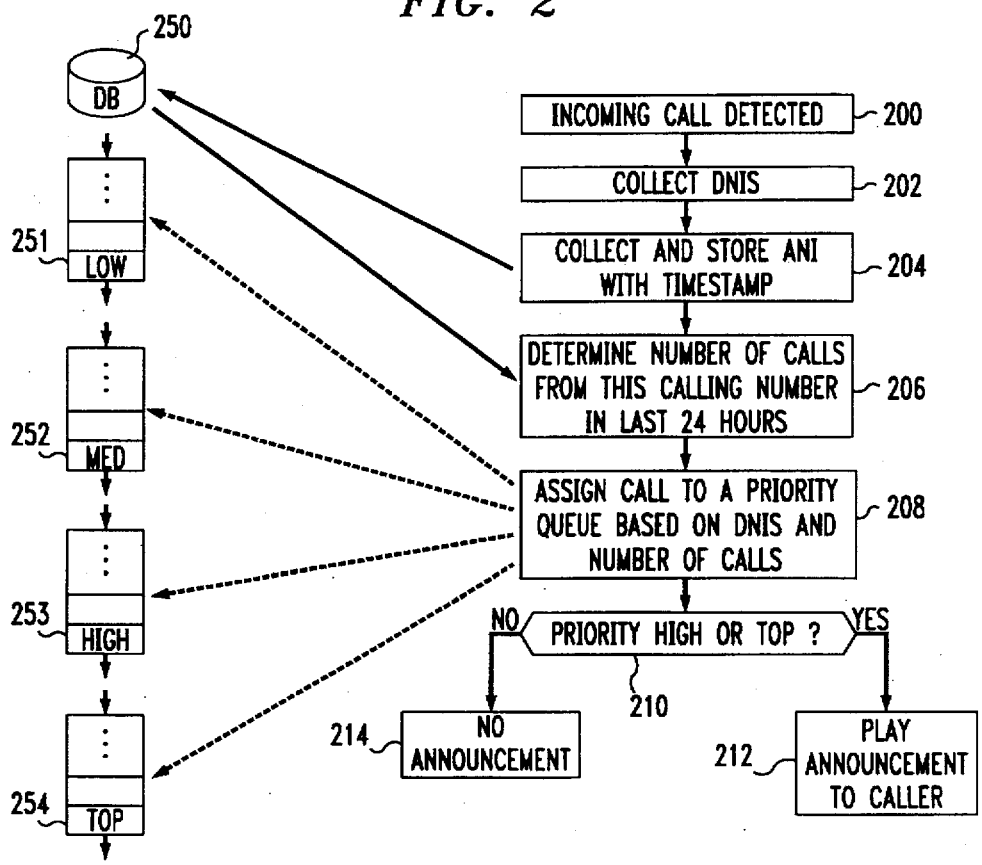
FIG. 2 is a block and flow diagram of operations of the call center of FIG. 1 in an airline reservations scenario.

As shown in FIG. 2, when processor 17 detects a call incoming to switching system 12 on a trunk 13, at step 200, it responds by collecting the DNIS information (the called number), at step 202, and also collecting the ANI information (the calling number) and storing the ANI in a database (DB) 250 along with a timestamp that indicates when the call came in, at step 204. Processor 17 then examines the contents of database 250 to determine how many entries there are for the ANI with a timestamp within the last 24 hours, at step 206. Processor 17 combines this determined information with the DNIS information, in the manner presented in Table 1, to assign the call to one of the four priority queues 251–254, at step 208. If the call has been assigned to the high-priority or top-priority queue, as determined at step 210, processor 17 causes a recorded announcement to that effect to be played out to the call, at step 212: other calls do not get an announcement, as indicated at step 214.

SCENARIO 2—ROADSIDE ASSISTANCE

Assume a roadside assistance service that is made available to an automobile club's members. To reach this service, all club members normally call the same "800" number, and their calls are served on a first come, first served, basis.

According to the invention, the level of a caller's motivation is deemed to be reflected by the number of calls to the service call center—either answered or unanswered, or only unanswered, at the call center's option—that the caller has made during the past hour, extreme weather conditions in the area from which the caller is calling, and what type of telephone instrument the caller is using (e.g., pay telephone or cellular telephone, as opposed to a residence telephone or a business telephone). The number of calls by this caller during the last hour is indicated by database contents, as in the preceding scenario. The area (e.g., Florida) from which the caller is calling is indicated by the call's ANI information, while the extreme weather conditions (e.g., a hurricane in Florida) are determined separately (e.g., from the National Weather Service) and are administratively programmed into switching system 12 by its administrator or by the supervisor of the call center. What type of telephone instrument the caller is using is indicated by the information indicator (II) digits that advantageously accompany the ANI information in some telephone networks. Each of the above call characteristics is factored into predicting caller motivation in the manner shown in Table 2 below.

TABLE 2

| call characteristic | motivation points |
|---|---|
| pay telephone or cellular telephone | 1 |
| other type of telephone | 0 |
| from Florida | 1 |
| from another area | 0 |
| first call within the hour | 0 |
| second call within the hour | 1 |
| third call within the hour | 2 |

The predicted motivation is then factored into selecting call treatment in the manner shown in Table 3 below.

TABLE 3

| total motivation points | queuing split(s) | queuing priority |
|---|---|---|
| 0 | roadside assistance | low |
| 1 | roadside assistance | medium |
| 2 | roadside assistance and backup | high |
| 3 | roadside assistance and backup with lookahead interflow attempts to other call center locations | top |
| 4 | forced multiple call handling | top |

As Table 3 indicates, a call with one or fewer motivation points is queued to only one group of agents (one split) that normally handles call coming into the roadside assistance number. A call with two motivation points is queued to two splits—the roadside assistance split and a backup split that normally handles other types of calls, such as membership inquiries, for example. A call with three motivation points is queued to the roadside assistance and backup splits, but in addition, the ACD system makes inquiries with any other call centers of the roadside assistance service—for example, those located in and serving other geographical areas—to determine whether they may be able to serve the call sooner than the call center which received the call. This capability, known as lookahead interflow (LAI), is a standard capability of AT&T Definity ACD systems. Finally, a call with four motivation points is routed to a split that has forced multiple call handling (FMCH) enabled, such that the call will immediately ring an agent's station even if that agent is already serving another call.

Figure 3:
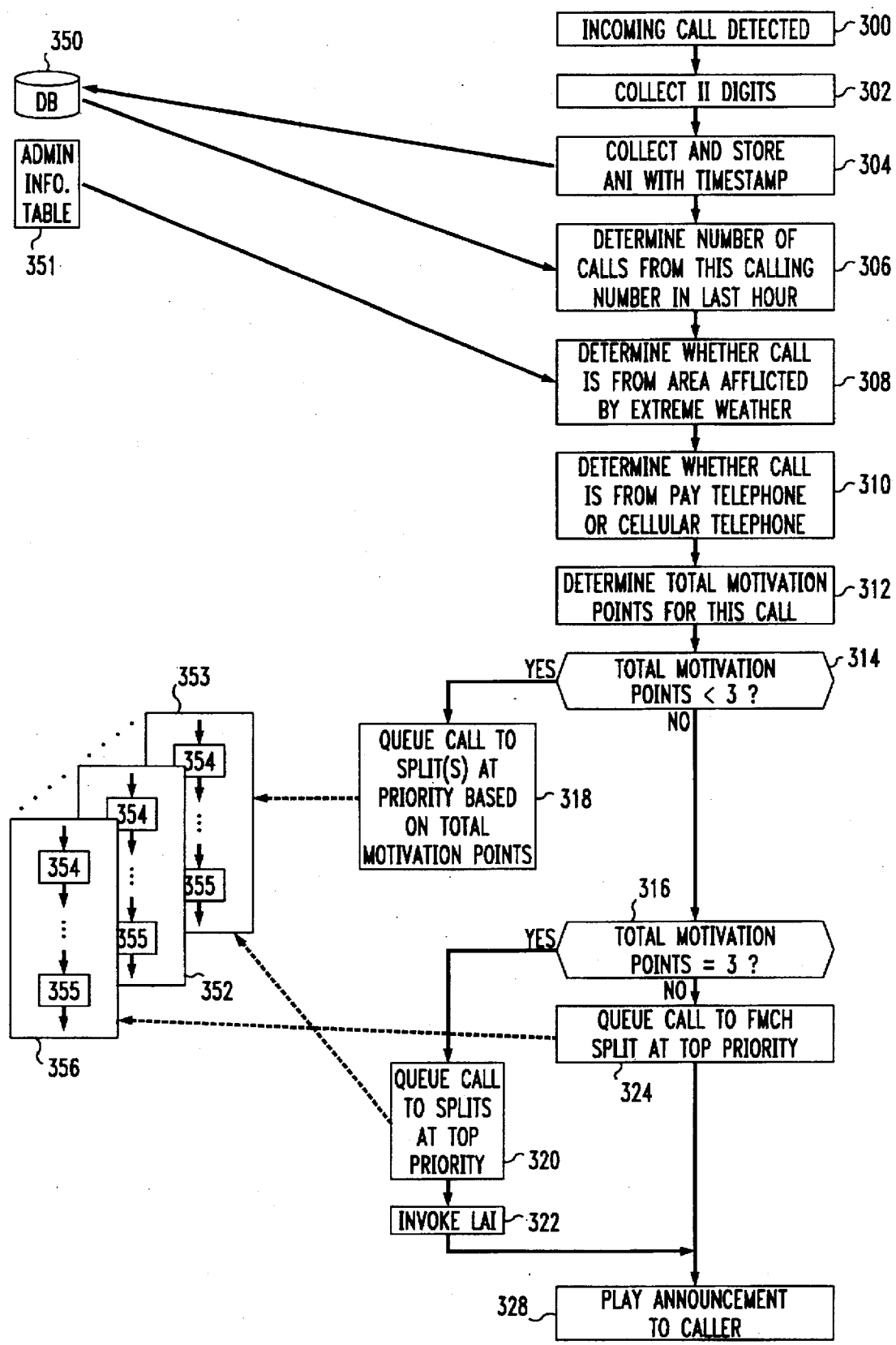
FIG. 3 is a block and flow diagram of operations of the call center of FIG. 1 in a roadside assistance scenario.

As shown in FIG. 3, when processor 17 detects a call incoming to switching system 12 on a trunk 13, at step 300, it responds by collecting the II digits, at step 302, and also collecting the ANI information and storing it in a database (DB) 350 along with a timestamp that indicates when the call came in, at step 304. Processor 17 then examines the contents of database 350 to determine how many entries there are for the ANI with a timestamp within the last hour, at step 306. Processor 17 also checks an administration information table 351 to determine whether the ANI identifies the call as coming in from an area afflicted by extreme weather, at step 308. Finally, processor 17 determines from the collected II digits whether the call is from a pay telephone or a cellular telephone, at step 310. Processor 17 combines the determinations made at steps 306, 308, and 310 according to the criteria of Table 2 to arrive at a total number of motivation points for the call, at step 312. If the call has fewer than three motivation points, as determined at step 314, processor 17 assigns the call to one or more selected splits 352–353, and within each selected split assigns the call to a queue 354–355 having a selected priority, both of which selections are made according to the criteria of Table 3, at step 318. If the call has exactly three motivation points, as determined at step 316, processor 17 assigns the call to both roadside assistance and backup splits 352–353, and within each split assigns the call to a queue 355 having top priority, at step 320. Processor 17 also invokes the lookahead interflow (LAI) feature for the call, at step 322. If the call has more than three motivation points, as determined at step 316, processor 17 assigns the call to a split 356 that has forced multiple call handling (FMCH) enabled, and within that split assigns the call to a queue 355 having top priority, at step 324. Following step 322 or 324, processor 17 causes the following recorded announcement to be played out to the call, at step 328: "We are aware that you have called multiple times. We are giving your call top priority. Please do not hang up; an agent will be with you shortly." If the call has not been assigned to a top priority queue, that announcement is not played out to the call.

SCENARIO 3—APPLIANCE COMPANY

Assume an appliance company with a published "800" number. Callers who call this number and do not immediately reach a call-center agent are placed in a queue to wait for an agent to become available. When all of the ports on switching system 12 are occupied, further calls are given "busy" treatment. The call center handles all of the company's calls—sales, service, billing, etc. The company tends to experience very high and sharp peaks in call traffic, during which time large numbers of calls get "busy" treatment, and much potential business is possibly lost.

According to the invention, the level of a caller's motivation is deemed to be reflected by how many times the caller has called in the previous 24 hours and by whether the caller bought an appliance from the company more than five years ago. The latter factor is assumed to indicate a high probability that the caller is ready to re-purchase, i.e., to replace the appliance with a new one. With caller motivation factored in, when call waiting times in the call queue are less than two minutes, all callers are queued with each caller being queued at a priority reflective of his or her estimated motivation. When waiting times in the call queue exceed two minutes, only callers who are deemed to be motivated are allowed to wait for access to agents, and all other callers receive "busy" treatment. In this way, motivated callers are never given "busy" treatment, whereby the amount of business that is lost during peak call times is significantly reduced.

Each of the above characteristics is factored into predicting caller motivation in the manner shown in Table 4 below.

TABLE 4

| call characteristic | motivation points |
|---|---|
| queue waiting time > 2 mins | 0 |
| queue waiting time <= 2 mins | 1 |
| caller bought appliance > 5 years ago | 1 |
| other callers | 0 |
| first call within 24 hours | 0 |
| second call within 24 hours | 1 |
| third or more call within 24 hours | 2 |

The predicted motivation is then factored into selecting call treatment in the manner shown in Table 5 below.

TABLE 5

| total motivation points | call treatment |
|---|---|
| 0 | busy |
| 1 | queue at low priority |
| 2 | queue at medium priority |
| 3 | queue at high priority |
| 4 | queue at top priority |

Figure 4:
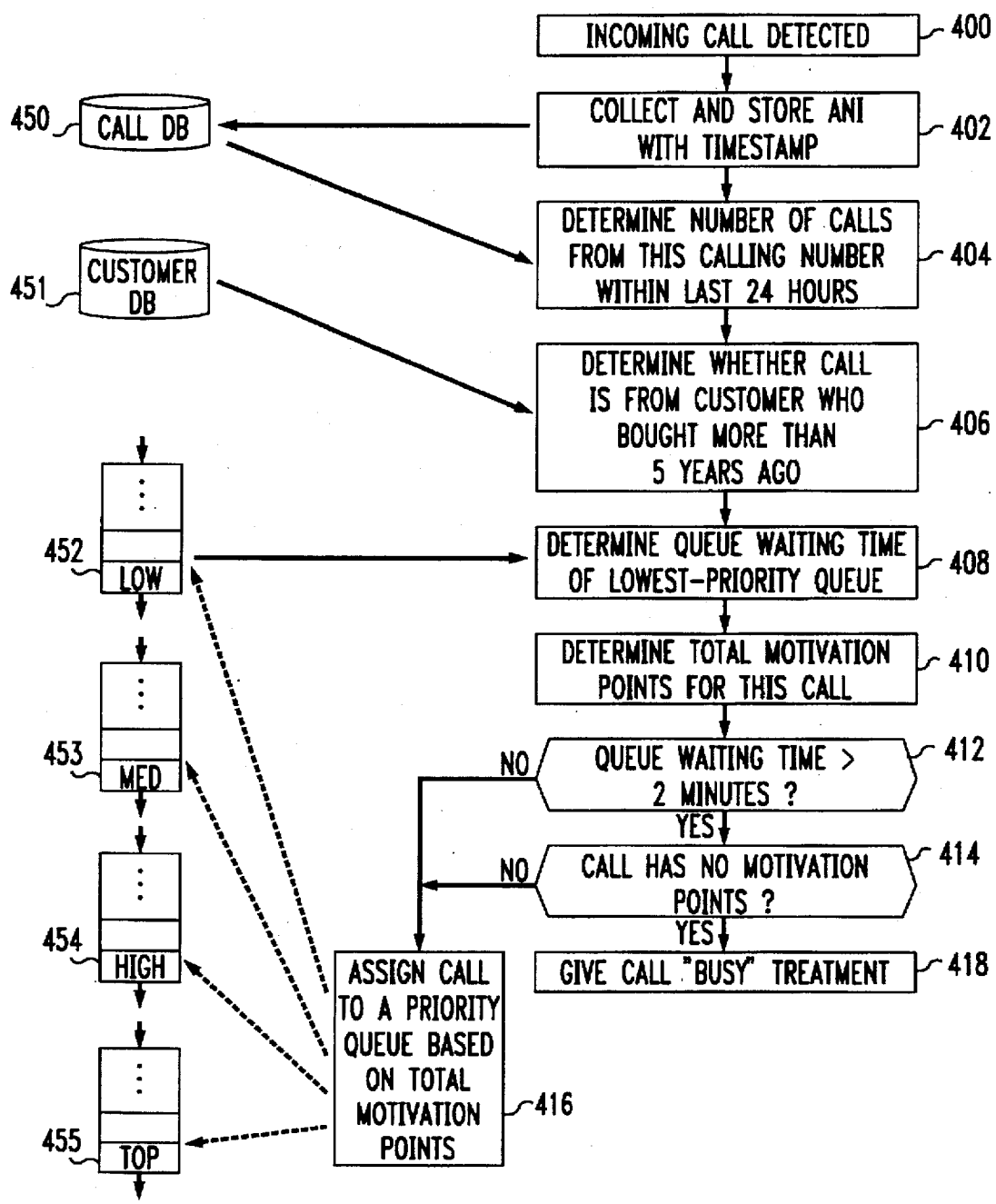
FIG. 4 is a block and flow diagram of operations of the call center of FIG. 1 in an appliance company scenario.

As shown in FIG. 4, when processor 17 detects a call incoming to switching system 12 on a trunk 13, at step 400, it responds by collecting the ANI information and storing the ANI in a call database (DB) 450 along with a timestamp that indicates when the call came in, at step 402. Processor 17 then examines the contents of call database 450 to determine how many entries there are for the ANI with a timestamp within the last 24 hours, at step 404. Processor 17 also examines contents of a customer database 451 to determine if the ANI matches the telephone number of any customers of the company, and if so, if the customer's record in customer database 451 indicates that the customer last purchased any appliance more than five years ago, at step 406. Processor 17 further determines the waiting times of calls in the lowest-priority call queue 452, at step 408. Processor 17 then combines the determinations it had made at steps 404, 406, and 408 according to the criteria of Table 4 to arrive at a total number of motivation points for the call, at step 410. If the call waiting time of calls in lowest-priority queue 452 does not exceed two minutes, as determined at step 412, processor 12 assigns the call to one of the priority queues 452–455 according to the criteria of Table 5, at step 416. But if the call waiting time of calls in lowest-priority queue 452 exceeds two minutes, processor 17 checks how many motivation points it had assigned to the call, at step 414. If the call has no motivation points, processor 12 causes "busy" treatment to be given to the call, at step 418. If the call has any motivation points, processor 17 assigns it to one of the priority queues 452–455 according to the criteria of Table 5, at step 416.

Of course, various changes, modifications, and extensions to the illustrative embodiments described above will be apparent to those skilled in the art. For example, one modification would be to only evaluate motivation when queuing times are greater than a predetermined amount of time (e.g., 2 minutes), and to ignore motivation and queue all calls at "low" priority when queue times are short, since it may be anticipated that no significant business will be lost due to caller abandonments or exhaustion of available trunks when waiting times are short. Another modification would be to consider transitory conditions other than weather, such as other natural or man-made disasters (earth quakes, airplane crashes, etc.)) Such changes and modifications can be made without departing from the spirit and the scope of the invention and without diminishing its attendant advantages. It is therefore intended that such changes and modifications be covered by the following claims.

The invention claimed is:

1. A method of handling calls in a call center, comprising the steps of:

in response to a call from a caller coming in to a call center, determining a number of unanswered call attempts made by the caller to the call center within a predetermined elapsed period of time;

predicting the caller's level of motivation from the determined number of unanswered call attempts, prior to answering the call;

selecting one of a plurality of different possible treatments to be given to the call, based upon the predicted level of motivation; and giving to the call the selected treatment at the call center.

2. The method of claim 1 wherein:

the step of determining comprises the step of determining whether the caller is a predetermined type of caller; and the step of predicting the caller's level of motivation from the determined number of unanswered call attempts comprises the step of predicting the caller's level of motivation in part from whether or not the caller is the predetermined type of caller.

3. The method of claim 2 wherein:

the predetermined type of caller comprises customers who have made a predetermined purchase in a predetermined timeframe.

4. The method of claim 1 wherein:

the step of predicting comprises the step of determining which telephone number the caller called from; and the step of predicting the caller's level of motivation from the determined number of unanswered call attempts comprises the step of predicting the caller's level of motivation in part from the determined telephone number.

5. The method of claim 1 wherein:

the step of selecting comprises the step of determining whether or not to connect the call to an agent of the call center, based upon the predicted level of motivation; and the step of giving comprises the step of queuing the call or refusing the call, based upon the determination.

6. The method of claim 1 wherein:

the step of selecting comprises the step of determining whether or not to play a predetermined announcement to the caller, based upon the predicted level of motivation; and the step of giving comprises the step of playing or not playing the predetermined announcement to the caller, based upon the determination.

7. The method of claim 1 wherein:

the step of giving comprises the step of giving the call the selected treatment before an agent of the call center answers the call.

8. A method of handling calls in a call center, comprising the steps of:

in response to a call from a caller coming in to a call center, determining a number of call attempts made by the caller to the call center within a predetermined elapsed period of time;

determining whether the call originated in a geographical area having a particular transitory characteristic;

predicting the caller's level of motivation for making the call, prior to answering the call, in part from the determined number of call attempts and in part from whether or not the call originated in the geographical area having the particular transitory characteristic;

selecting one of a plurality of different possible treatments to be given to the call, based upon the predicted level of motivation; and giving to the call the selected treatment at the call center.

9. The method of claim 8 wherein:

the transitory characteristic comprises a weather condition.

10. A method of handling calls in a call center, comprising the steps of:

in response to a call from a caller coming in to a call center, determining a number of call attempts made by the caller to the call center within a predetermined elapsed period of time;

determining whether the call originated from a predetermined type of telephone instrument;

predicting the caller's level of motivation for making the call, prior to answering the call, in part from the determined number of call attempts and in part from whether or not the call originated from the predetermined type of telephone instrument;

selecting one of a plurality of different possible treatments to be given to the call, based upon the predicted level of motivation; and giving to the call the selected treatment at the call center.

11. The method of claim 10 wherein:

the predetermined type of telephone instrument comprises a pay telephone or a mobile telephone.

12. A method of handling calls in a call center, comprising the steps of:

in response to a call from a caller coming in to a call center, determining a number of call attempts made by the caller to the call center within a predetermined elapsed period of time;

determining which telephone number the caller called;

predicting the caller's level of motivation for making the call, prior to answering the call, in part from the determined number of call attempts and in part from the determined telephone number;

selecting one of a plurality of different possible treatments to be given to the call, based upon the predicted level of motivation; and giving to the call the selected treatment at the call center.

13. A method of handling calls in a call center, comprising the steps of:

in response to a call from a caller coming in to a call center, predicting a level of motivation of the caller for making the call, prior to answering the call;

selecting one of a plurality of priorities for queuing the call, based upon the predicted level of motivation; and queuing the call at the call center at the selected priority.

14. A method of handling calls in a call center, comprising the steps of:

in response to a call from a caller coming in to a call center, predicting a level of motivation of the caller for making the call, prior to answering the call;

determining an anticipated waiting time of the call in a call queue of the call center;

selecting one of a plurality of priorities for queuing the call based upon both the predicted level of motivation and the determined anticipated waiting time; and queuing the call at the call center at the selected priority.

15. A method of handling calls in a call center, comprising the steps of:

in response to a call from a caller coming in to a call center, predicting a level of motivation of the caller for making the call, prior to answering the call;

selecting one of a plurality of agent splits to handle the call, based upon the predicted level of motivation; and queuing the call to the selected split.

16. An apparatus for handling calls in a call center, comprising:

means responsive to a call from a caller coming in to a call center, for determining a number of unanswered call attempts made by the caller to the call center within a predetermined elapsed period of time;

means connected to the determining means, for predicting the caller's level of motivation from the determined number of unanswered call attempts, prior to the call being answered at the call center;

means connected to the predicting means, for selecting one of a plurality of different possible treatments to be given to the call, based upon the predicted level of motivation; and means connected to the selecting means, for giving to the call the selected treatment at the call center.

17. The apparatus of claim 16 wherein:

the determining means comprise means for determining whether the caller is a predetermined type of caller; and the means for predicting the caller's level of motivation from the determined number of unanswered call attempts comprise means for predicting the caller's level of motivation in part from whether or not the caller is the predetermined type of caller.

18. The apparatus of claim 17 wherein:

the predetermined type of caller comprises customers who have made a predetermined purchase in a predetermined timeframe.

19. The apparatus of claim 16 wherein:

the predicting means comprise means for determining which telephone number the caller called from; and the means for predicting the caller's level of motivation from the determined number of unanswered call attempts comprise means for predicting the caller's level of motivation in part from the determined telephone number.

20. The apparatus of claim 16 wherein:

the selecting means comprise means for determining whether or not to connect the call to an agent of the call center, based upon the predicted level of motivation; and the giving means comprise means for queuing the call or refusing the call, based upon the determination.

21. The apparatus of claim 16 wherein:

the selecting means comprise means for determining whether or not to play a predetermined announcement to the caller, based upon the predicted level of motivation; and the giving means comprise means for playing or not playing the predetermined announcement to the caller based upon the determination.

22. The apparatus of claim 16 wherein:

the giving means give the call the selected treatment before an agent of the call center answers the call.

23. An apparatus for handling calls in a call center, comprising:

means responsive to a call from a caller coming in to a call center, for determining a number of call attempts made by the caller to the call center within a predetermined elapsed period of time;

means for determining whether the call originated in a geographical area having a particular transitory characteristic;

means for predicting the catlet's level of motivation, prior to the call being answered at the call center, in part from the determined number of call attempts and in part from whether or not the call originated in the geographical area having the particular transitory characteristic;

means connected to the predicting means, for selecting one of a plurality of different possible treatments to be given to the call, based upon the predicted level of motivation; and means connected to the selecting means, for giving to the call the selected treatment at the call center.

24. The apparatus of claim 23 wherein:

the transitory characteristic comprises a weather condition.

25. An apparatus for handling calls in a call center, comprising:

means responsive to a call from a caller coming in to a call center, for determining a number of call attempts made by the caller to the call center within a predetermined elapsed period of time;

means for determining whether the call originated from a predetermined type of telephone instrument;

means for predicting the caller's level of motivation, prior to the call being answered at the call center, in part from the determined number of call attempts and in part from whether or not the call originated from the predetermined type of telephone instrument;

means connected to the predicting means, for selecting one of a plurality of different possible treatments to be given to the call, based upon the predicted level of motivation; and means connected to the selecting means, for giving to the call the selected treatment at the call center.

26. The apparatus of claim 25 wherein:

the predetermined type of telephone instrument comprises a pay telephone or a mobile telephone.

27. An apparatus for handling calls in a call center, comprising:

means responsive to a call from a caller coming in to a call center, for determining a number of call attempts made by the caller to the call center within a predetermined elapsed period of time;

means for determining which telephone number the caller called;

means for predicting the caller's level of motivation, prior to the call being answered at the call center, in part from the determined number of call attempts and in part from the determined telephone number;

means connected to the predicting means, for selecting one of a plurality of different possible treatments to be given to the call, based upon the predicted level of motivation; and means connected to the selecting means, for giving to the call the selected treatment at the call center.

28. An apparatus for handling calls in a call center, comprising:

means responsive to a call from a caller coming in to a call center, for predicting a level of motivation of the caller for making the call, prior to the call being answered at the call center;

means for selecting one of a plurality of priorities for queuing the call, based upon the predicted level of motivation; and means for queuing the call at the call center at the selected priority.

29. An apparatus for handling calls in a call center, comprising:

means responsive to a call from a caller coming in to a call center, for predicting a level of motivation of the caller for making the call, prior to the call being answered at the call center;

means for determining an anticipated waiting time of the call in a call queue of the call center;

means connected to the means for determining the anticipated waiting time, for selecting one of a plurality of priorities for queuing the call, based upon both the predicted level of motivation and the determined anticipated waiting time; and means for queuing the call at center at the selected priority.

30. An apparatus for handling calls in a call center, comprising:

means responsive to a call from a caller coming in to a call center, for predicting a level of motivation of the caller for making the call, prior to the call being answered at the call center;

means for selecting one of a plurality of agent splits to handle the call, based upon the predicted level of motivation; and means for queuing the call to the selected split.

* * * * *